United States Patent
Spitzl

(10) Patent No.: US 10,207,924 B2
(45) Date of Patent: Feb. 19, 2019

(54) METHOD AND DEVICE FOR PRODUCING SYNGAS

(71) Applicant: Ralf Spitzl, Troisdorf (DE)

(72) Inventor: Ralf Spitzl, Troisdorf (DE)

( * ) Notice: Subject to any disclaimer, the term of this patent is extended or adjusted under 35 U.S.C. 154(b) by 62 days.

(21) Appl. No.: 15/105,455

(22) PCT Filed: Dec. 16, 2014

(86) PCT No.: PCT/EP2014/003387
§ 371 (c)(1),
(2) Date: Jun. 16, 2016

(87) PCT Pub. No.: WO2015/090575
PCT Pub. Date: Jun. 25, 2015

(65) Prior Publication Data
US 2016/0311683 A1    Oct. 27, 2016

(30) Foreign Application Priority Data
Dec. 16, 2013   (DE) .................. 10 2013 020 905

(51) Int. Cl.
*C01B 3/38*        (2006.01)
*C01B 3/26*        (2006.01)
(Continued)

(52) U.S. Cl.
CPC .............. *C01B 3/382* (2013.01); *A47K 10/06* (2013.01); *C01B 3/26* (2013.01); *C01B 3/342* (2013.01);
(Continued)

(58) Field of Classification Search
CPC .................. C01B 3/382; C01B 3/342
See application file for complete search history.

(56) References Cited

U.S. PATENT DOCUMENTS 8,691,181 B2    4/2014  Schunk et al.
2003/0236312 A1  12/2003  O'Rear
(Continued)

FOREIGN PATENT DOCUMENTS

DE    102007022723 A1   11/2008
DE    102010027474 A1    1/2012
(Continued)

OTHER PUBLICATIONS

NaturalGas.org pp. 1-3 downloaded on Jun. 6, 2018 (Year: 2018).*
(Continued)

*Primary Examiner* — Douglas B Call
(74) *Attorney, Agent, or Firm* — Panitch Schwarze Belisario & Nadel LLP

(57) ABSTRACT

Methods and devices are provided for producing syngas with an adjustable molar $CO/H_2$ ratio. Syngas can have different proportions of CO and $H_2$ (molar $CO/H_2$ ratio) depending on the type and composition of starting materials. To set the desired molar $CO/H_2$ ratio, a first sub-process is combined with at least one additional sub-process selected from: a sub-process $T_2$ by which a second syngas B is generated from the starting material, the syngas having a molar ratio ($V_2$) of CO to $H_2$, wherein $V_1 \neq V_2$; a sub-process $T_3$ by which the hydrocarbon(s) of the hydrocarbon-containing starting material is/are split substantially into solid carbon and hydrogen; and a sub-process $T_4$ based on the reaction equation: $CO+H_2O \rightarrow 2CO_2+H_2$. The methods and devices are suitable for producing syngas useful as a starting material in a plurality of chemical syntheses, for example oxo, Fischer-Tropsch, or Reppe syntheses.

23 Claims, 3 Drawing Sheets

(51) Int. Cl.
    *C01B 3/34*    (2006.01)
    *D06F 57/12*   (2006.01)
    *A47K 10/06*   (2006.01)
(52) U.S. Cl.
    CPC ...... *D06F 57/12* (2013.01); *C01B 2203/0233* (2013.01); *C01B 2203/0238* (2013.01); *C01B 2203/0277* (2013.01); *C01B 2203/1235* (2013.01); *C01B 2203/1258* (2013.01); *C01B 2203/143* (2013.01); *C01B 2203/148* (2013.01); *Y02P 20/582* (2015.11)

(56) References Cited

U.S. PATENT DOCUMENTS

| | | | |
|---|---|---|---|
| 2004/0102532 | A1 | 5/2004 | Landis et al. |
| 2007/0186474 | A1 | 8/2007 | Rabovitser et al. |
| 2007/0264186 | A1* | 11/2007 | Dybkjaer ............... B01J 8/062 423/418.2 |
| 2009/0030240 | A1* | 1/2009 | Olah ..................... C01B 3/38 568/671 |
| 2009/0060805 | A1* | 3/2009 | Muradov ............... B01J 8/12 422/186.04 |
| 2011/0236293 | A1 | 9/2011 | Hardman et al. |
| 2013/0005838 | A1 | 1/2013 | Eilos et al. |
| 2013/0131199 | A1* | 5/2013 | Lien .................... B01D 53/22 518/702 |
| 2015/0041309 | A1 | 2/2015 | Spitzl |
| 2015/0246337 | A1* | 9/2015 | Hong .................... C01B 3/342 422/186.29 |

FOREIGN PATENT DOCUMENTS

| | | |
|---|---|---|
| DE | 102012007230 A1 | 10/2013 |
| EP | 2199254 A1 | 6/2010 |
| EP | 2540663 A1 | 1/2013 |
| WO | 2004010454 A2 | 1/2004 |
| WO | 2012006155 A1 | 1/2012 |
| WO | WO2014/038907 * | 3/2014 |

OTHER PUBLICATIONS

English translation of International Search Report dated Apr. 20, 2015 in International Application No. PCT/EP2014/003387.

Written Opinion of the International Searching Authority (German language) dated Apr. 20, 2015 in International Application No. PCT/EP2014/003387.

Written Opinion of the International Preliminary Examining Authority (German language) dated Dec. 21, 2015 in International Application No. PCT/EP2014/003387.

Response (German language) to the Written Opinion of the International Searching Authority dated Oct. 9, 2015 in International Application No. PCT/EP2014/003387.

Response (German language) to the Written Opinion of the International Preliminary Examining Authority dated Feb. 19, 2016 in International Application No. PCT/EP2014/003387.

International Preliminary Examination Report (German language) dated Mar. 24, 2016 in International Application No. PCT/EP2014/003387.

International Preliminary Examination Report (English language) dated Mar. 24, 2016 in International Application No. PCT/EP2014/003387.

\* cited by examiner

METHOD AND DEVICE FOR PRODUCING SYNGAS

CROSS-REFERENCE TO RELATED APPLICATIONS

This application is a Section 371 of International Application No. PCT/EP2014/003387, filed Dec. 16, 2014, which was published in the German language on Jun. 25, 2015, under International Publication No. WO 2015/090575 A1 and the disclosure of which is incorporated herein by reference.

BACKGROUND OF THE INVENTION

The invention relates to methods for producing synthesis gas of a desired or adjustable molar ratio of hydrogen to carbon monoxide. The invention further relates to devices which are particularly suitable for carrying out the methods according to the invention.

The term "synthesis gas" or "syngas" denotes gas mixtures that consist mainly of hydrogen and carbon monoxide, but admixtures of carbon dioxide, nitrogen, noble gases, methane and other hydrocarbons may also be present. Synthesis gas is used as a an intermediate product or starting material for many synthesizing processes; for example for the production of methanol and other alcohols, dimethyl ether, synthetic fuels (Fischer-Tropsch synthesis), synthetic natural gas (SNG), ammonia (Haber-Bosch process), and for oxo syntheses. The base materials thus obtainable are important starting materials or intermediates for the chemical industry, for example for the production of active pharmaceutical ingredients, plant protection agents and plastics.

Synthesis gas is usually obtained by catalytic conversion of carbon-containing or hydrocarbon-containing raw materials (such as coal, natural gas, methane). Here, in particular the following chemical reactions are important:

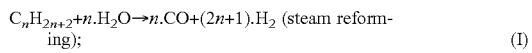
$C_nH_{2n+2} + n.H_2O \rightarrow n.CO + (2n+1).H_2$ (steam reforming); (I)

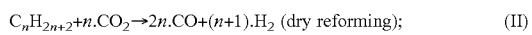
$C_nH_{2n+2} + n.CO_2 \rightarrow 2n.CO + (n+1).H_2$ (dry reforming); (II)

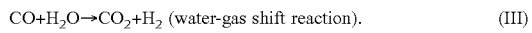
$CO + H_2O \rightarrow CO_2 + H_2$ (water-gas shift reaction). (III)

Reactions (I) and (II) are endothermic; the technical implementation of this process usually takes place at elevated temperatures (about 700-850° C.), using catalysts such as nickel oxide catalysts or mixed metal oxides.

The synthesis gas thus obtained contains CO and $H_2$ in a specific molar ratio ("molar ratio $CO/H_2$") which depends on the type and—possibly varying—composition of the raw materials used, and on the method employed.

For example, a method according to the above equation (I) yields a high-hydrogen synthesis gas having a molar ratio of $CO/H_2$ of 1:3 when using methane as a starting material; in the case of ethane, a synthesis gas is obtained having a molar ratio $CO/H_2$ of 2:5, etc.

Accordingly, a method according to the above equation (II) provides a low-hydrogen synthesis gas having a molar ratio of $CO/H_2$ of 1:1 when using methane as a starting material; in the case of ethane, a synthesis gas is obtained having a molar ratio of $CO/H_2$ of 4:3, etc.

For use as a starting material in subsequent synthesis processes, it is necessary or desirable that the molar ratio $CO/H_2$ of the synthesis gas has a certain value or that it lies within a certain range, and that the value or range is maintained as constant as possible, even in the case of fluctuating composition of the starting material.

For example, in the case of synthesis gas to be used for the production of dimethyl ether, a mole ratio $CO/H_2$ of 1:1 is necessary or desirable; for the production of fuels (Fischer-Tropsch process) or of methanol, a $CO/H_2$ ratio of 1:2 is necessary or desirable; and for oxo synthesis, a ratio ranging from 2:3 to 2:5 is necessary or desirable.

In order to produce synthesis gas with a desired $CO/H_2$ ratio, methods for cryogenic separation of raw synthesis gas into product streams that are high in hydrogen and high in carbon monoxide have been proposed; see European patent application publication EP 0 898 136 A2, inter alia. These methods are disadvantageous in several respects, especially as multiple cooling devices, as well as corresponding devices for separating liquid and vapor phases are required for the cryogenic separation.

It is also possible to reduce the CO content in the synthesis gas by water-gas shift reaction (III); however, this has the disadvantage that $CO_2$ is formed.

Another known possibility of adjusting the $CO/H_2$ ratio is the addition of hydrogen, which must, however, be generated by other, energy-consuming methods (such as electrolysis); see German published patent application DE 10 2010 027 474 A1.

A further problem in the production of synthesis gas is that the available raw gases (feed gases) may contain large amounts of impurities or admixtures of other gases (such as $H_2S$). This is true, for example, for feed gases that are generated in biogas installations or pyrolysis plants (biogas, pyrolysis gas). Since these impurities often act as catalyst poisons for the catalysts used in the production of synthesis gas, an expensive pre-treatment for purification of the crude gases is frequently necessary in order to separate the impurities (e.g. desulfurization).

SUMMARY OF THE INVENTION

The object of the present invention was therefore to provide methods and devices which permit the production of synthesis gas with a desired, adjustable molar $CO/H_2$ ratio, regardless of the composition of the starting materials, which composition may be subject to fluctuations. In addition, certain embodiments of the invention enable processes of high dynamics, even up to a start/stop operation.

According to another aspect of the invention, the underlying object was to provide methods and devices which permit the production of synthesis gas such that the use of the conventionally required catalysts can be fully or partially dispensed with. The use of catalysts can be detrimental, because some of the starting materials used for the production of synthesis gas may contain constituents that act as catalyst poisons (e.g. $H_2S$).

To achieve the aforementioned object, which object relates to the adjustment of the $CO/H_2$, a method for producing a synthesis gas product having a desired, adjustable molar $CO/H_2$ ratio V is provided by the present invention.

The method comprises a first sub-process $T_1$, by which a first synthesis gas A is generated from a hydrocarbon-containing starting material (educt), the first synthesis gas A having a molar ratio ($V_1$) of CO to $H_2$.

In order to set the desired molar $CO/H_2$ ratio, the first sub-process is combined with at least one second or further sub-processes. The second or further sub-processes is/are selected from the group comprising the following methods:
a sub-process $T_2$ by which a second synthesis gas B is generated from the aforementioned starting material, the second synthesis gas having a molar ratio ($V_2$) of CO to $H_2$, wherein $V_1 \neq V_2$;

a sub-process $T_3$ by which the hydrocarbon(s) of the aforementioned hydrocarbon-containing starting material is/are broken down substantially into solid carbon and hydrogen;

a sub-process $T_4$ which is based on the following reaction equation: $CO+H_2O \rightarrow 2CO_2+H_2$.

By any combination of a sub-process (or process step) $T_1$ with one or more of the sub-processes (or process steps) $T_2$, $T_3$, $T_4$, a synthesis gas having a desired, adjustable $CO/H_2$ ratio can be obtained.

A combination of the sub-processes can preferably take place by merging or bringing together the gaseous synthesis gas products of each sub-process, in particular the synthesis gases A and B, such that a synthesis gas product with the desired molar $CO/H_2$ ratio V is obtained. This can be achieved in particular by adjusting the mixing ratio of the gaseous synthesis gas products of the sub-processes, in particular the synthesis gases A and B. In continuous operation, the mixing ratio of the synthesis gases A and B, for example, can be set by the fact that one of the two sub-processes is run at a higher or lower throughput than the respective other sub-process.

By changing the mixing ratio and the throughput rate of at least one sub-process, the molar $CO/H_2$ ratio V of the resulting synthesis gas can be set to the desired value or in a desired range, even when variation in the starting material composition occurs or when there is a change between different starting materials (with different compositions).

A combination of two or more sub-processes as described above may also include a step in which the product formed in a sub-process is supplied to a storage device and stored until it is further converted in at least one further sub-process in order to obtain a synthesis gas product of the desired molar $CO/H_2$ ratio.

Likewise, the synthesis gas product can either be used directly in a follow-up process as a reactant, or first be fed to a storage device.

Although only two sub-processes with different $CO/H_2$ ratios ($V_1 \neq V_2$) have been mentioned above, this does not exclude a combination thereof with one or more additional sub-processes (e.g., $T_3$, $T_4$) that are suitable for changing the $CO/H_2$ ratio of the synthesis gas.

The methods of the invention are characterized by the fact that the $CO/H_2$ ratio $V_1$ of a first sub-process is less than the $CO/H_2$ ratio $V_2$ of a second or further sub-process, or vice versa. It is preferred that $V_1 \leq 1$ and $V_2 \geq 1$ (or vice versa). In the first case, a high-hydrogen synthesis gas is formed; in the second case, a low-hydrogen synthesis gas is formed.

Thus, according to the present invention, the combination of at least two sub-processes is provided, wherein at least one of the sub-processes ($T_1$, $T_2$) produces a low-hydrogen synthesis gas whose molar ratio of CO to $H_2$ is at least 1, and at least a second or a further sub-process ($T_2$, $T_1$) produces a high-hydrogen synthesis gas whose molar ratio of CO to $H_2$ is less than or equal to 1.

More particularly, a method which is based on the following equation can be used as a method for producing a high-hydrogen synthesis gas:

$$C_nH_{2n+2}+n.H_2O \rightarrow n.CO+(2n+1).H_2, \tag{I}$$

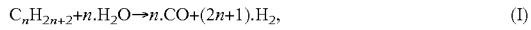

where $C_nH_{2n+2}$ represents an alkane, and n preferably represents 1 to 20, especially 1 to 8, particularly preferably 1 to 4. With increasing chain length, the molar $CO/H_2$ ratio approaches the value 1/2.

The formula $C_nH_{2n+2}$ generally refers to alkanes, but other hydrocarbon compounds (e.g., unsaturated hydrocarbons, aromatic compounds) can be used, as well as mixtures of various hydrocarbon compounds. Preferably, hydrocarbons are used which are gaseous or liquid under normal conditions (20° C., 1013 hPa). Likewise, however, the use of solid carbon (such as graphite) or solid hydrocarbons is possible.

In the case of methane (preferred starting material) the reaction proceeds according to the equation $$CH_4+H_2O \rightarrow CO+3H_2, \tag{Ia}$$

wherein the molar ratio $CO/H_2$ takes the value 1/3. Accordingly, when using natural gas (main component: methane), a high-hydrogen synthesis gas having a $CO/H_2$ ratio of about 1:3 is obtained.

As a method for producing a low-hydrogen synthesis gas, in particular a method can be used which is based on the following reaction equation:

$$C_nH_{2n+2}+n.CO_2 \rightarrow 2n.CO+(n+1).H_2, \tag{II}$$

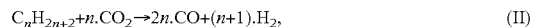

wherein $C_nH_{2n+2}$ represents alkane, and n is preferably 1 to 20, especially 1 to 8, more preferably 1 to 4. With increasing chain length, the molar ratio $CO/H_2$ approaches the value of 2.

In the case of methane (preferred starting material) the reaction proceeds according to the equation $CH_4+CO_2 \rightarrow 2CO+2H_2$, wherein the molar ratio $CO/H_2$ takes the value 1. Accordingly, when using natural gas (main component: methane) a low-hydrogen synthesis gas having a $CO/H_2$ ratio of approximately 1:1 is obtained.

In the above-described methods for producing a synthesis gas low or high in hydrogen, apart from to the above-mentioned alkanes, other hydrocarbons such as unsaturated hydrocarbons (olefins such as ethylene; alkynes; cycloalkanes, aromatic compounds)), also in the form of mixtures, may be used as starting material(s).

Generally, such gases or mixtures of gases can be used as hydrocarbon-containing starting materials as have a hydrocarbon content, in particular a methane content, of preferably at least 20 vol %, more preferably at least 40 vol %. However, the use of liquid or solid hydrocarbon-containing starting materials or of coal is not excluded.

Examples of suitable hydrocarbon-containing starting materials are, in particular, the following: biogas or crude biogas, flare gas, pyrolysis gases, natural gas.

As catalysts for the above-mentioned sub-processes for producing a gas low in hydrogen and a gas high in hydrogen (reaction equations (I), (II)), the known prior art catalysts can be used—as mentioned in the introduction. In these sub-processes the reaction temperature is usually set in the range of 600-900° C., preferably 700-850° C.

According to a preferred embodiment of the invention it is provided that at least one of the sub-processes generates a low-hydrogen synthesis gas (A) in accordance with the following reaction equation:

$$C_nH_{2n+2}+n.CO_2 \rightarrow 2n.CO+(n+1).H_2, \tag{II}$$

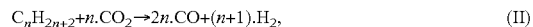

wherein $C_nH_{2n+2}$ represents alkane, and n preferably is 1 to 20, especially 1 to 8, more preferably 1 to 4; wherein the reaction $$CH_4+CO_2 \rightarrow 2CO+2H_2 \tag{IIa}$$

is preferred;

and that at least one further of the sub-processes produces a high-hydrogen synthesis gas (B) according to the following reaction equation:

$$C_nH_{2n+2}+n.H_2O \rightarrow n.CO+(2n+1).H_2, \tag{I}$$

wherein $C_nH_{2n+2}$ represents alkane, and n preferably is 1 to 20, especially 1 to 8, more preferably 1 to 4;
wherein the reaction $$CH_4 + H_2O \rightarrow CO + 3H_2 \tag{Ia}$$

is preferred.

The synthesis gases (e.g., the above-mentioned synthesis gases (A) and (B)) generated in the sub-processes are merged or brought together, during which process the mixture ratio is adjusted or automatically controlled such that a synthesis gas product having the desired molar $CO/H_2$ ratio V is obtained.

By continuously measuring the gas composition in the product gas streams of the sub-processes, the sub-processes can be controlled by open-loop or closed-loop control in such a way that the $CO/H_2$ ratio of the total product gas stream (i.e. of the synthesis gas product), formed by combining, can be kept constant, even with fluctuating composition of the feed gas or the feed gases.

The setting of the mixing ratio of the synthesis gases A and B may preferably be achieved in that one of the two sub-processes is run at a higher or lower throughput than the respective other sub-process.

Thus, for example, the sub-process that produces a high-hydrogen synthesis gas can be run with a higher throughput than the respective other sub-process (generating a low-hydrogen synthesis gas), preferably with 1.5 times to 10 times, more preferably with 2 times to 5 times the throughput, relative to the other sub-process.

The above principle is illustrated by the following example, which describes the preparation of synthesis gas from methane.

The sub-process for producing a high-hydrogen synthesis gas is conducted according to the above equation (I):

$$CH_4 + H_2O \rightarrow CO + 3H_2, \tag{Ia}$$

wherein the $CO/H_2$ ratio is 1/3.

The sub-process for producing a low-hydrogen synthesis gas is conducted according to the above equation (II):

$$CH_4 + CO_2 \rightarrow 2CO + 2H_2, \tag{IIa}$$

wherein the $CO/H_2$ ratio is 1/1.

To obtain, for example, a synthesis gas having a desired $CO/H_2$ ratio of 1/2, the first sub-process (Ia) is conducted with twice the throughput, based on the throughput of the second sub-process (IIA):

$$\underline{2}CH_4 + \underline{2}H_2O \rightarrow \underline{2}CO + \underline{6}H_2, \tag{Ia}$$

$$CH_4 + CO_2 \rightarrow 2CO + 2H_2; \tag{IIa}$$

In sum:

$$3CH_4 + 2H_2O + CO_2 \rightarrow 4CO + 8H_2.$$

Thus, by combining the two sub-processes (and merging or mixing the product streams) a synthesis gas with the desired $CO/H_2$ ratio of 1/2 is obtained.

This synthesis gas can be used as starting material for subsequent syntheses. For mixing the product streams (synthesis gases) generated by the sub-processes, known mixing devices for mixing of gases may be used.

To adjust (or control automatically) the $CO/H_2$ ratio in the synthesis gas obtained by combining two or more sub-processes, a preferable way to proceed is to measure, preferably continuously, the molar ratio of CO to $H_2$ ($V_1$, $V_2$, . . . ) in the synthesis gases (A, B, . . . ) produced by the sub-processes.

Depending on the respective values determined for the $CO/H_2$ ratio, the throughput in the individual sub-processes can be controlled by open-loop or closed-loop control such that a synthesis gas product having the above-mentioned $CO/H_2$ ratio V is obtained. Similarly, the measured values of the $CO/H_2$ ratio can be used to combine or mix the synthesis gas products produced in the sub-processes in such proportions that a synthesis gas product with the desired $CO/H_2$ ratio V results.

For monitoring of the manufacturing process it may also be advantageous or necessary to measure, preferably continuously, the CO and $H_2$ proportion (and hence the $CO/H_2$ ratio) in the synthesis gas product.

Sensors, measuring probes and associated measuring devices for determining the composition of a gas, in particular for determining the proportions of $H_2$, CO and $CO_2$, are known in the art (e.g., hydrogen sensors, carbon monoxide sensors).

According to the present invention it is further provided that the first sub-process ($T_1$) and/or the aforementioned second or further sub-processes ($T_2$) is/are combined with a sub-process $T_3$ by which the hydrocarbon(s) of the above-mentioned hydrocarbon-containing starting material is/are broken down essentially into solid carbon and hydrogen.

This sub-process ($T_3$) is preferably a method that is based on a pyrolytic or plasma-catalytic decomposition of hydrocarbons according to the following reaction equation:

$$C_nH_{2n+2} \rightarrow n \cdot C_{solid} + (2n+2) \cdot H_2; \tag{IV}$$

or, if methane is used as starting material:

$$CH_4 \rightarrow C_{solid} + 2H_2. \tag{IVa}$$

Due to hydrogen formed in the above process, the proportion of hydrogen contained in the synthesis gas can be increased, and the molar $CO/H_2$ ratio (i.e. the quotient) can be reduced.

The carbon obtained as a by-product can be separated and used, for example, as activated carbon or pigment black (carbon black). The pyrolytic decomposition of hydrocarbons is preferably performed by low-temperature plasmas or by high temperatures, e.g. thermally or in the electric arc.

According to the present invention it is provided that a sub-process based on the pyrolytic decomposition of hydrocarbons is combined with a sub-process for generating a low-hydrogen synthesis gas and/or with a sub-process for producing a high-hydrogen synthesis gas (as described above). According to one embodiment of the present invention it is provided that a sub-process based on the pyrolysis of hydrocarbons is combined with a sub-process for producing a synthesis gas, preferably as follows:

1. sub-process: $C_nH_{2n+2} \rightarrow n \cdot C_{solid} + (2n+2) \cdot H_2$ (IV)

(pyrolysis);

2. sub-process: $C_nH_{2n+2} + n \cdot CO_2 \rightarrow 2n \cdot CO + (n+1) \cdot H_2$ (II).

For example, when methane is used as a hydrocarbon starting material, by combining the sub-processes $$CH_4 \rightarrow C_{solid} + 2H_2 \tag{IVa}$$

$$CH_4 + CO_2 \rightarrow 2CO + 2H_2 \tag{IIa}$$

the following result or sum is obtained:

$$2CH_4 + CO_2 \rightarrow 2CO + 4H_2$$

($CO/H_2$ ratio: 1:2 or 0.5).

According to a further embodiment, the optional, combined implementation of another sub-process T4 is provided which is based on the water-gas shift reaction (III) and causes an increase in the $H_2$ content of the synthesis gas product, accompanied by a reduction of the CO content.

$$CO + H_2O \rightarrow 2CO_2 + H_2. \quad \text{(III)}$$

The above process may be carried out after the actual process for the production of synthesis gas (as described above); that is, the synthesis gas product initially produced is subjected to a water-gas shift reaction. The $CO_2$ formed in the water-gas shift reaction can be re-used (after separation of the $H_2$) for the production of synthesis gas (see above, reactions (II), (IIa)).

The reaction conditions (temperature, catalysts, etc.) for the water-gas shift reaction are known to those skilled in the art (e.g. iron(III) oxide catalysts; 250-450° C.). To perform the reaction, a special reactor may be used into which the synthesis gas is fed, if necessary with the addition of water or water vapor.

By combining two or more sub-processes, as described above, the molar $CO/H_2$ ratio V of the synthesis gas product can be adjusted or automatically controlled over a wide range. According to one embodiment of the invention, this ratio is set or automatically controlled to be in the range of 1 to 10, preferably in the range of 1 to 5, particularly preferably in the range of 1 to 3. According to another embodiment, this ratio is in the range of 0.1 to 1, preferably in the range of 0.5 to 1, particularly preferably in the range of 0.7 to 1.

Furthermore, the invention relates particularly to methods by which a synthesis gas product is produced the molar $CO/H_2$ ratio of which is 1:3, 1:2, 1:1, 2:1, 3:1, 2:5, 3:7 or 4:9.

According to a preferred embodiment of the present invention, a plasma method and a corresponding device (plasma reactor) is used for at least one of the sub-processes for the production of synthesis gas, or for at least one sub-step, with microwave-assisted plasma processes, or microwave plasmas, being particularly preferred. The sub-processes mentioned can be carried out in separate reactors (e.g., in serial or parallel arrangement or operation), or in the same reactor.

In the embodiment that uses a shared reactor, the $CO/H_2$ ratio can be regulated by controlling the ratio of the starting materials (hydrocarbon, carbon dioxide and water) in the reactor.

The use of plasma processes, in particular microwave-assisted plasma processes, has the advantage that an increase in reaction rate is caused, similarly to the use of catalysts, which is why such methods are also called "plasma-catalytic processes". Consequently, the use of catalysts, as is required in the conventional processes for synthesis gas production (see above, reactions (I), (II)) can be dispensed with completely or largely.

It has furthermore been proven advantageous that plasma methods, especially microwave-assisted plasma methods, have a high selectivity and energy efficiency. In addition, plasma-catalytic methods have the advantage that they are significantly less susceptible to conventional catalyst poisons (e.g., sulfur).

Consequently, the use of at least one plasma process, in particular at least one microwave-assisted plasma process, is particularly advantageous, and preferred according the present invention, when feed gases are used that contain impurities or admixtures which may act as catalyst poisons and inhibit or inactivate the catalysts conventionally used in synthesis gas production. The admixtures may, for example, be higher hydrocarbons (>4 carbon atoms), $CO_2$, $H_2O$, solvents, $H_2S$ or other impurities (such as ash, liquid hydrocarbons, solid carbon, siloxanes).

Examples of feed gases that often contain admixtures or impurities are, in particular, biogas, flare gases and pyrolysis gases. Such feed gases must usually be subjected to expensive cleaning to remove the impurities. When using plasma processes, particularly microwave-assisted plasma processes, in accordance with the invention, expensive pre-cleaning of the feed gases can be dispensed with. In general, the feed gas containing impurities (such as raw biogas, flare gas, pyrolysis gas) is fed directly into a plasma reactor for plasma-catalytic conversion, for the purpose of generating synthesis gas.

Plasma reactors, more particularly plasma reactors for generating microwave plasmas, have already been described in the prior art (e.g. International patent application Publication No. WO 2004/010454; German published patent application DE 10 2012 007 230 $A_1$); such plasma reactors are in principle suitable for carrying out the method according to the invention. Generally, such microwave plasma sources and microwave plasma reactors are suitable and preferred as they are capable of generating a large-volume (e.g. up to 5 or more) plasma which is preferably non-thermal and which remains stable even in continuous or long-term operation, and as permit high gas velocities (for example, 1 m/s to 500 m/s, or higher; preferably 5 to 200 m/s, more preferably 10 to 150 m/s). However, supersonic flow velocities are possible.

Preferably, the methods according to the invention are carried out continuously, i.e. under steady supply of feed gas(es) (and optionally further process gases) to the microwave reactor and under continuous removal from the reactor of the product stream (synthesis gas stream) containing the (intermediate) products. Unconverted reactants can be completely or partially separated from the synthesis gas stream and recycled back into the reactor.

Preferably, in the plasma-catalytic processes according to the present invention, the microwave plasma is operated in a pressure range of 10 to 10,000 hPa, in particular in the range from 20 to 3,000 hPa, in particular in the range from 50 to 1,500 hPa, in particular under atmospheric pressure conditions (850 to 1100 hPa, in particular 950 to 1050 hPa).

The plasma-catalytic processes according to this invention are typically carried out at temperatures in the range of about 50 to 2000° C., in particular 100 to 1000° C. If necessary, the temperature prevailing in the reaction chamber or plasma reactor can be adjusted in a certain range by known heating or cooling devices (such as gas cooling, liquid quenching).

Preferably, the method is carried out in such a way that in the plasma reactor, a pressure difference or pressure gradient is set, particularly a negative pressure or positive pressure relative to ambient pressure (atmospheric pressure). This can be achieved in particular by one or more of the following measures: open-loop control or closed-loop control of the inflow of the fluid, especially gaseous, starting materials into the reactor, preferably by one or more valves and/or pumps/compressors; open-loop control or closed-loop control of the outflow of gases, in particular of the product-containing plasma gas, from the plasma reactor, preferably by one or more valves and/or pumps. The static pressure inside the device can be chosen at will and adapted to the respective process.

It has surprisingly been found that the use of plasma reactors is advantageous for carrying out the inventive methods for synthesis gas production for yet another reason, namely that in this way it is possible to perform two or more of the sub-processes in the same plasma reactor and thereby combine the methods.

Here, an embodiment is preferred in which at least the sub-processes based on the reaction equations (I) and (II) are carried out in combination in the same plasma reactor, in particular in a microwave plasma reactor:

$$C_nH_{2n+2} + n.H_2O \rightarrow n.CO + (2n+1).H_2, \quad (I)$$

$$C_nH_{2n+2} + n.CO_2 \rightarrow 2n.CO + (n+1).H_2. \quad (II)$$

To this end, generally, a hydrocarbon-containing gas or gas mixture (e.g. methane, natural gas, biogas), with addition of $CO_2$ and water (or steam) is introduced into a plasma reactor and is converted there into synthesis gas, under the action of a plasma. In order to avoid a deposition of carbon or carbon compounds around or behind the plasma reactor, the process can be operated such that the C/O ratio is maintained at <1 (typically 0.9) (oxygen excess). If necessary, excess oxygen can be removed, for example, by subsequent oxidation in a carbon bed (such as activated carbon).

By varying the amounts of $CO_2$ and water admixed to the feed gas, the molar $CO/H_2$ ratio of the resulting synthesis gas can be influenced. In particular, it can in this way be achieved that, even with a varying composition of the feed gases, the $CO/H_2$ ratio is kept constant and is, in particular, adjusted to a desired value.

For example, with the above-described combined or joint conversion according to the general reaction equation (V), a synthesis gas having a $CO/H_2$ ratio of 1:2 (=0.5) can be obtained:

$$3C_nH_{2n+2} + CO_2 + (3n-1).H_2O \rightarrow \rightarrow (3n+1).CO + (6n+2).H_2. \quad (V)$$

Depending on the composition of the feed gas and the admixed $CO_2$ fraction or water fraction, synthesis gas products can be obtained which have another $CO/H_2$ ratio.

Further, the present invention also extends to methods for synthesis gas production in which a first sub-process is combined with at least one second or further sub-processes in such a manner that these processes are performed in succession or "in series". Here, the synthesis gas produced in a first sub-process is converted in a second or further sub-process, in particular in order to attain a change or adjustment of the $CO/H_2$ ratio.

The embodiment described above is particularly advantageous when starting materials are used which have a high $CO_2$ content (such as biogas) or contain $CO_2$ in excess (relative to the hydrocarbon content), e.g. pyrolysis gases or flare gases.

Biogas typically has 40-75 vol % methane and 25-55 vol % $CO_2$. According to a preferred embodiment of the invention, the methane-$CO_2$ mixture is converted in a first sub-process according to equation (IIa), resulting in a (low-hydrogen) synthesis gas:

$$CH_4 + CO_2 \rightarrow 2CO + 2H_2. \quad (IIa)$$

This low-hydrogen synthesis gas is converted in a second sub-process, with the addition of water (or water vapor), to a synthesis gas higher in hydrogen:

$$CO + H_2O \rightarrow 2CO_2 + H_2 \text{ (water-gas shift).} \quad (III)$$

The above-described combination of two sub-processes for producing a synthesis gas higher in hydrogen can be realized by a plasma process, the two sub-processes preferably being carried out in the same plasma reactor. Alternatively, the two sub-processes could be carried out in succession, likewise using a plasma process.

The plasma-enhanced implementation of these methods is particularly advantageous when raw biogas or flare gases are used as starting materials. It is furthermore advantageous that in this case expensive pre-cleaning of raw biogas and flare gas can be dispensed with, as the plasma processes used are not affected or only insignificantly affected by any existing admixtures or impurities.

As explained above, the methods according to the present invention are suitable for the production of synthesis gas starting from feed gas mixtures, such as biogas or flare gas, containing methane and $CO_2$. Generally, this may be a feed gas mixture having a methane content of at least 40 vol %, preferably at least 50 vol %, in particular from 50 to 75 vol %, and a $CO_2$ content of at least 25 vol %, preferably at least 35 vol %, particularly from 35 to 55 vol %.

Another advantage of the methods of the invention lies in the fact that they enable the use of pyrolysis gas and pyrolysis oil as starting material(s) for the production of synthesis gas. Pyrolysis gas and pyrolysis oil are obtained in the gasification of biomass (such as wood) and other feed materials (e.g. waste, used tires, plastics) under pyrolysis conditions. The composition of the pyrolysis gas depends, inter alia, on the type of feedstock used (biomass, etc.) and on the reaction conditions (temperature, reaction time, pressure conditions). Usually, pyrolysis gas (e.g. wood gas) contains relatively low levels of hydrocarbons (e.g. 2 vol % methane), but relatively high levels of $CO_2$ and $N_2$ (in total, up to 60 vol %, for example). In connection with the present invention, the term "pyrolysis gas" generally refers to gases which can be obtained by pyrolytic decomposition of hydrocarbonaceous material, in particular of biomass.

According to a further embodiment, the present invention relates to a process for the production of synthesis gas from hydrocarbon-containing starting materials, such as pyrolysis gas, which—based on the hydrocarbon content (in vol %)—contain $CO_2$ in excess. Generally, the approach here is to enrich the feed gas, before or during the conversion to synthesis gas, with hydrocarbons or a hydrocarbon-containing mixture, preferably natural gas.

Starting from a pyrolysis gas that contains $CO_2$ in excess, the production of synthesis gas is carried out in such a way that the pyrolysis gas is enriched with preferably gaseous hydrocarbons (e.g. natural gas, particularly methane) and converted in a plasma reactor, particularly a microwave plasma reactor. Alternatively, the enrichment with hydrocarbons can be carried out prior to the introduction of the pyrolysis gas into the reactor.

The inventive enrichment with hydrocarbons especially causes the $CO_2$, originally present in excess, to be converted into synthesis gas ($CO$, $H_2$) in accordance with the following equation $$C_nH_{2n+2} + n.CO_2 \rightarrow 2n.CO + (n+1).H_2 \quad (II)$$

$C_nH_{2n+2}$ represents alkanes; however, other hydrocarbon compounds may be used as well.

According to the invention, the synthesis gas thus obtained may be converted in a further sub-process, with addition of water (or steam), according to the reaction equation $$C_nH_{2n+2} + n.H_2O \rightarrow n.CO + (2n+1).H_2 \quad (I)$$

whereby the hydrogen content of the synthesis gas is increased, that is, the $CO/H_2$ ratio is reduced.

The above-described (sub-)methods for producing synthesis gas are preferably carried out in a plasma-catalytic manner, i.e. using plasma reactors, particularly microwave-assisted plasma reactors.

Preferably, the two sub-processes described above are carried out in the same plasma reactor in a combined manner, wherein the above-mentioned enrichment with hydrocarbons can be carried out in such a way that the hydrocarbons are mixed with the feed gas or are introduced separately into the plasma reactor.

In view of the above, the present invention also extends to a method for producing synthesis gas from a hydrocarbon-containing and carbon dioxide-containing feed gas, in particular a pyrolysis gas or flare gas, which contains $CO_2$ in excess—based on the hydrocarbon content (in vol %)—the method comprising at least the steps of:

enriching the feed gas with, preferably gaseous, hydrocarbons or with a hydrocarbon-containing gas (especially methane, ethane, propane, butane; natural gas);

conversion, preferably plasma-catalytic conversion, of the feed gas enriched with hydrocarbons to a synthesis gas containing CO and $H_2$, optionally with admixture of $H_2O$.

In many cases, the problem arises that the available feed gases have a hydrocarbon content that is too low (e.g., less than 25 vol %, particularly less than 10 vol %) or a $CO_2$ content that is too high (e.g. more than 30 vol %, in particular more than 50 vol %), and therefore are scarcely suitable for the production of synthesis gas. According to the present invention, it is therefore provided that such feed gases are enriched with hydrocarbons, preferably with gaseous hydrocarbons or a hydrocarbon-containing gas (especially methane, ethane, propane, butane; natural gas) prior to being used for synthesis gas production, or during the conversion, in particular the plasma-catalytic conversion, to synthesis gas. Enrichment is preferably carried out by admixture of hydrocarbons to the respective feed gas, or by feeding to the reactor or plasma reactor in which the conversion to synthesis gas takes place.

According to the invention, in the production of synthesis gas a pyrolysis oil may be used as a carbon source. Pyrolysis oil is formed as a liquid by-product in the pyrolytic decomposition of, for example, biomass; in addition to water it contains a variety of organic compounds, such as alcohols, phenols, carboxylic acids, ketones and aldehydes.

Preferably, the production of synthesis gas from pyrolysis oil is carried out in such a manner that the pyrolysis oil is converted in a plasma reactor, in particular a microwave-assisted plasma reactor. In order to adjust a desired $CO/H_2$ ratio, $CO_2$ and/or $H_2O$ may be added to the pyrolysis oil before or during plasma-catalytic conversion (as described above); for example, by introducing these reactants via corresponding feed lines into the plasma reactor.

In view of the above, the present invention extends to a method for the production of synthesis gas from a hydrocarbon-containing (pyrolysis) oil, wherein the method comprises at least the step of:

conversion of the (pyrolysis) oil with $H_2O$ and/or $CO_2$, preferably in a plasma reactor, in particular in a microwave-assisted plasma reactor.

The oil can, for example, be introduced into the reactor in the form of a vapor or in the form of an aerosol.

The methods and sub-processes described above may be combined with each other in different ways, depending on their application. Furthermore, each of the embodiments described can be combined with one or more feature(s) from the foregoing description of the invention. It is further provided that the inventive methods for the preparation of synthesis gas are combined with subsequent synthesis processes in which the synthesis gas produced is used as starting material or intermediate product.

The invention also extends to methods of the kind described above in which no complete conversion of the starting materials into the desired products, particularly into synthesis gas, takes place. In many cases, partial conversion is sufficient to generate an adequate creation of value.

In the case of incomplete or only partial conversion of the starting materials (such as hydrocarbons, $CO_2$CO, $H_2O$), the unreacted starting materials or constituents can be recycled back into the process, possibly after previous separation from the product stream (synthesis gas). The residual amounts of unreacted reactants (e.g. $H_2$, CO, $CO_2$), particularly residual gases, accumulating in subsequent synthesis processes can be returned (recycled) to an inventive method or sub-process for the production of synthesis gas.

For example, in the catalytic (or plasma-catalytic) conversion of synthesis gas to methanol and dimethyl ether, unreacted synthesis gas ($H_2$, CO) and $CO_2$ accumulate as residual gases, which can be re-used as starting materials for the production of synthesis gas, as described above. In this way a virtually 100% conversion of materials can be achieved.

The synthesis gas products produced by the inventive methods described above may be used as starting materials or intermediate products in a variety of syntheses, such as in oxo synthesis (hydroformylation), Fischer-Tropsch syntheses or Reppe syntheses.

The invention further comprises devices which are particularly suitable for carrying out the methods according to the invention for producing a synthesis gas product, as described above.

According to one embodiment of the invention, such a device comprises at least the following components:

a plasma reactor ($R_1$), in particular a microwave plasma reactor, for plasma-catalytic conversion of a hydrocarbon-containing starting material and optionally further reactants to a synthesis gas, at least one further reactor ($R_2$), preferably a plasma reactor, which is disposed downstream of the above-mentioned plasma reactor ($R_1$) and which is connected to the plasma reactor via at least one line, for the further conversion of the synthesis gas produced in the plasma reactor ($R_1$) to a synthesis gas product;

and devices for measuring the CO content and/or the $H_2$ content at least of the synthesis gas produced in the plasma reactor ($R_1$), or for measuring the CO content and/or the $H_2$ content of the synthesis gas generated in the plasma reactor ($R_1$) and of the synthesis gas product generated in the further reactor ($R_2$).

Here, the plasma-catalytic conversion in the plasma reactor ($R_1$) may, for example, comprise at least one sub-process according to any one of the above-mentioned reaction equations (I), (Ia), (II) and (IIa), or especially a combination of (I) with (II), and the conversion in the downstream reactor ($R_2$) may, for example, comprise a sub-process according to one of the above-mentioned reaction formulas (III) or (IV). The device enables the combined implementation of at least two sub-processes by (at least) two interconnected (here: series-connected) reactors.

Optionally, an intermediate reservoir for the synthesis gas generated in the plasma reactor ($R_1$) may be provided, in which the synthesis gas is stored before it is passed into the reactor ($R_2$).

Devices for measuring the CO and $H_2$ content, such as gas sensors, measuring probes and corresponding measuring devices, are known in the art and are commercially available.

According to another preferred embodiment, it is provided that the device of the invention comprises devices allowing a determination of the $CO/H_2$ ratios based on the measured CO contents and $H_2$ contents, and devices making it possible to control, by open-loop or closed-loop control, the throughput in the plasma reactor ($R_1$) or/and in the further reactor ($R_2$) as a function of the values determined for the $CO/H_2$ ratio in such a manner that a synthesis gas product with the desired $CO/H_2$ ratio is obtained. The above-mentioned devices can be provided, in particular, in the form of circuits, microprocessors, computers and computer software.

Alternatively or additionally, an open-loop or closed-loop control of the $CO/H_2$ ratio in the synthesis gas product can take place by varying, depending on the determined CO contents and $H_2$ contents (or the resulting ratio), the reaction conditions, especially temperature and/or pressure, in the reactor or the reactors, or by varying the amount of the reactants (such as $CO_2$, $H_2O$) used for the synthesis gas production.

According to another embodiment, a device according to the invention comprises at least the following components:
- a first plasma reactor ($R_1$), more particularly a microwave plasma reactor, for converting a hydrocarbon-containing starting material and optionally further reactants to a first synthesis gas (A) having a first molar $CO/H_2$ ratio ($V_1$),
- at least one further reactor ($R_2$), preferably a plasma reactor, for converting a hydrocarbon-containing starting material and optionally further reactants to a second synthesis gas (B) having a second molar $CO/H_2$ ratio ($V_2$),
- devices for bringing together or mixing the synthesis gases (A, B) to obtain a synthesis gas product having a desired molar $CO/H_2$ ratio, and
- devices for measuring the CO content and/or the $H_2$ content at least of the synthesis gas produced in the reactor ($R_1$) and of the synthesis gas produced in the reactor ($R_2$); optionally, additional devices for measuring the CO content and/or the $H_2$ content of the synthesis gas product formed by merging the synthesis gases.

Here, the plasma-catalytic conversion in the plasma reactor ($R_1$) may, for example, comprise at least one sub-process according to one of the above-mentioned reaction equations (I) or (Ia), and the conversion in the reactor ($R_2$) may, for example, comprise at least one sub-process according to one of the above-mentioned reaction equations (II) or (IIA), or vice versa.

The device enables combined performing of two or more sub-processes; this is achieved by a combined arrangement of at least two reactors ($R_1$, $R_2$ . . . ) which are connected to one another, for example by tubes, such that the product streams generated in the respective reactors can be united. Preferably, the reactors ($R_1$, $R_2$ . . . ) are operated in parallel and continuously.

Optionally, an intermediate reservoir for the synthesis gas (A) generated in the plasma reactor ($R_1$) and/or an intermediate reservoir for synthesis gas (B) generated in the plasma reactor ($R_2$) can be provided, in which intermediate reservoir the synthesis gas is stored prior to being brought together or to being mixed.

Devices for bringing together or mixing of materials, in particular fluid or gaseous substances (in this case synthesis gases) are well known in the art; for example, tubes, mixers and/or mixing valves. The devices make it possible to bring together the synthesis gases (A, B, . . . ) produced in the sub-processes and to mix them in a certain ratio, in order to obtain a synthesis gas product with a desired molar $CO/H_2$ ratio.

According to a further, preferred embodiment it is provided that the device of the invention comprises devices for determining the $CO/H_2$ ratio based on the CO contents and $H_2$ contents measured, and devices for open-loop or closed-loop control of the throughput in the reactor ($R_1$) and/or in the further reactor ($R_2$).

Preferably, the devices for bringing together or mixing the synthesis gases (A, B, . . . ) can be controlled by open-loop or closed-loop control such that adjustment or automatic control of the mixing ratio is made possible, preferably as a function of the values determined for the molar $CO/H_2$ ratio of the synthesis gases (A, B). In this way, a synthesis gas product can be produced which has a desired and/or constant $CO/H_2$ ratio.

Open-loop control devices or closed-loop control devices by which the devices for bringing together or mixing of synthesis gases can be controlled through open-loop or closed-loop control are in principle known to those skilled in the art; in particular, control valves, circuits, microprocessors, computers, software and other means and methods of automation technology come into consideration for that purpose.

Devices that may be used as plasma reactors suitable for the devices and methods of the invention are, in particular, such devices as comprise the following features:
- a plasma chamber in which a substantially tubular recipient, open at one or both ends, is arranged, which recipient is made of a microwave-transmissive dielectric material, the interior of the recipient serving as a reaction space;
- one or more inlet openings and/or supply lines for introducing a hydrocarbon-containing starting material and optionally further, especially gaseous, reactants into the reaction space;
- one or more outlet openings and/or discharge lines for discharging the product stream, containing the reaction product(s) (particularly CO, $H_2$), from the reaction space;
- a plasma source disposed on the plasma chamber and/or connected with the plasma source, in particular a microwave plasma source, for generating a plasma in the plasma chamber and for the plasma-catalytic conversion of the starting materials or reactants.

According to a preferred embodiment, the free diameter of the tubular recipient is at least 4 cm; this diameter may also be greater, especially 6 to 20 cm or more, for example. It has surprisingly been found that by such dimensioning of the dielectric tube (recipient, particularly of quartz glass) the energy efficiency and the selectivity of the plasma processes, especially of the methods according to the invention, can be considerably improved.

The devices described in the above description, their individual components, technical features etc. can be combined with each other in different ways, depending on the application. Furthermore, each of the embodiments described can be combined with one or more feature(s) from the foregoing description of the invention. Furthermore, it is envisaged that the devices of the invention for generating synthesis gas are combined with subsequently used devices, such as reactors for carrying out synthesis processes, in which the synthesis gas produced is used as starting material or intermediate product.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
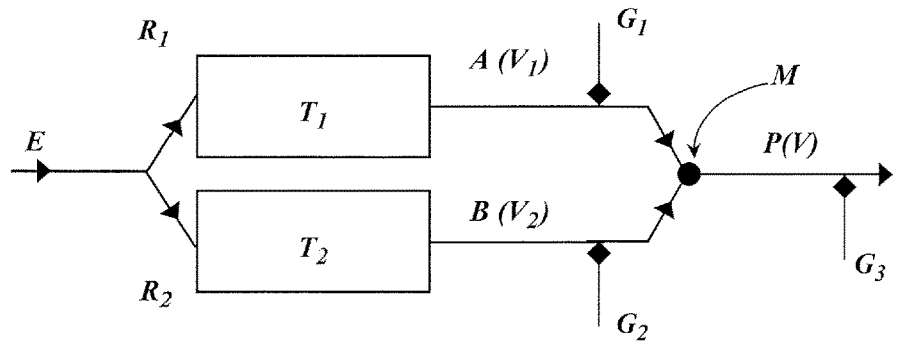
FIG. 1 is a schematic flow diagram showing the principle of a method according to one embodiment of the invention.

FIG. 1 shows the principle of a method according to the invention in which a hydrocarbon-containing starting material (E) is divided into two sub-streams. In two different sub-processes ($T_1$, $T_2$), which are combined with each other and which are carried out in two reactors ($R_1$, $R_2$), the starting material is converted into synthesis gases (A, B) having a molar CO/$H_2$ ratio $V_1$ or $V_2$, respectively, ($V_1 < V_2$ or $V_1 > V_2$). The reactors ($R_1$, $R_2$) are preferably plasma reactors, particularly microwave plasma reactors.

In particular, such methods are suitable as sub-processes ($T_1$, $T_2$) as are based on the above-mentioned reaction equations (I), (Ia), (II) and (IIa).

The synthesis gas streams thus obtained are combined in an adjustable or automatically controllable mixing device (M), so that a synthesis gas product (P) with a molar CO/$H_2$ ratio (V) results.

To measure the CO and $H_2$ contents and to determine the CO/$H_2$ ratios in the synthesis gas streams of the sub-processes ($T_1$, $T_2$) and in the synthesis gas product (P), gas sensors ($G_1$, $G_2$, $G_3$) are installed which have corresponding measuring devices and evaluation units. By open-loop or closed-loop control devices associated therewith, the throughput in the reactors ($R_1$, $R_2$) and/or the mixing ratio in the mixing device (M) are/is controlled by open-loop or closed-loop control such that a synthesis gas product (P) having a desired, preferably a constant, CO/$H_2$ ratio (V) results.

Figure 2:
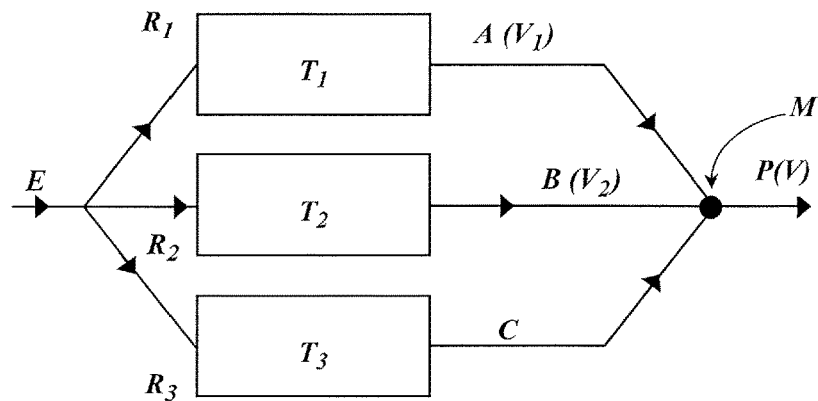
FIG. 2 is a schematic flow diagram showing the principle of a further embodiment of the method and device according to the invention.

FIG. 2 shows the principle of a further embodiment of the method and device according to the invention, in which—in a modification of the embodiment shown in FIG. 1—a combination with a third sub-process $T_3$ provided. This sub-process can, for example, be a process based on the above-mentioned reaction equation (IV) or (IVa) (plasma-pyrolytic decomposition with formation of solid carbon and $H_2$). As shown in FIG. 1, gas sensors with associated measuring devices, evaluation units, control devices, etc. may be provided (not shown in FIG. 2).

Figure 3:
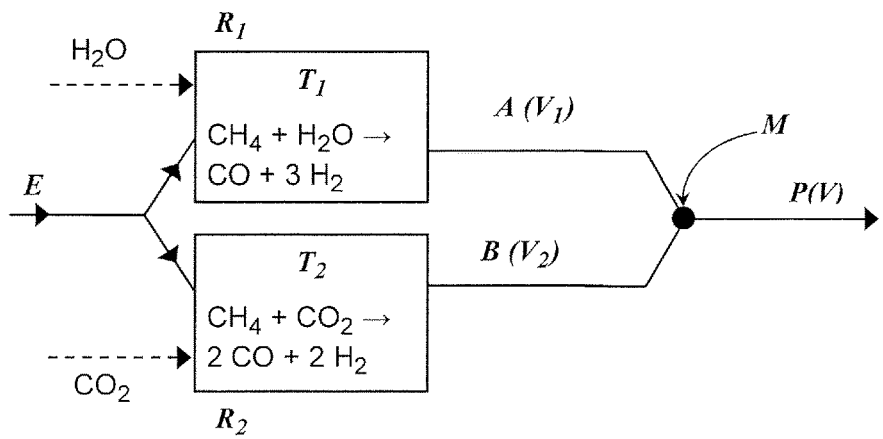
FIG. 3 is a schematic flow diagram showing the principle of another embodiment and device according to the invention as a concrete example for the embodiment shown in FIG. 1.

FIG. 3 shows the principle of another embodiment and device according to the invention, wherein—as a concrete example for the embodiment shown in FIG. 1—as the sub-process $T_1$, a method is used which is based on the reaction equation (steam reforming)

$$CH_4 + H_2O \rightarrow CO + 3H_2 \qquad (Ia)$$

and wherein as the sub-process $T_2$, a method is used which is based on the reaction equation ("dry reforming")

$$CH_4 + CO_2 \rightarrow 2CO + 2H_2 \qquad (IIa)$$

In the above case, methane or a methane-containing gas mixture (e.g. natural gas, biogas) is used as hydrocarbon-containing starting material.

The reactants required for these reactions ($H_2O$, $CO_2$) are, where necessary, fed, via corresponding supply lines, into the respective reactor ($R_1$, $R_2$).

As shown in FIG. 1, gas sensors may be provided which comprise associated measuring devices, evaluation units, open-loop or closed-loop control devices, etc. (not shown in FIG. 3). One can also make use of the possibility of controlling, by open-loop or closed-loop control, the admixture of $H_2O$ and/or $CO_2$ as a function of the values determined for the CO/$H_2$ ratio.

Figure 4:
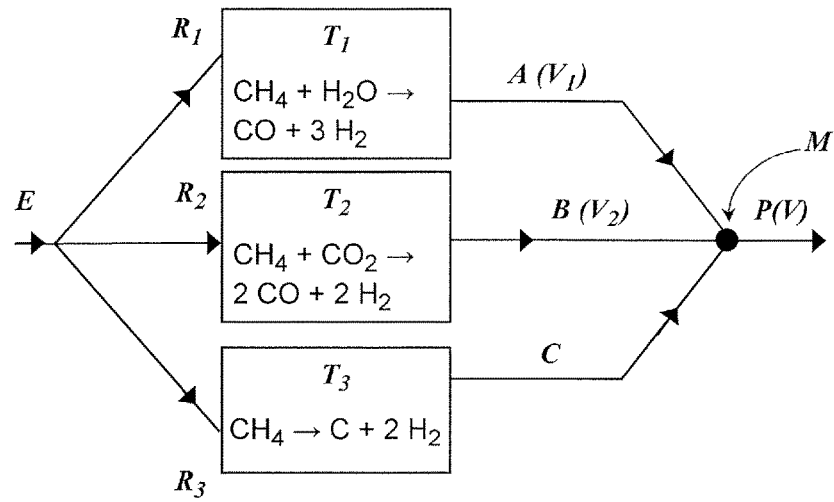
FIG. 4 is a schematic flow diagram showing the principle of another embodiment of the method and device according to the invention, based on FIG. 2 and FIG. 3.

FIG. 4 shows the principle of another embodiment of the method and device according to the invention, based on FIG. 2 and FIG. 3, as described above. A method for the pyrolytic decomposition of hydrocarbons according to the following reaction equation $$CH_4 \rightarrow C_{solid} + 2H_2 \qquad (IVa)$$

is used as the sub-process $T_3$.

Figure 5:
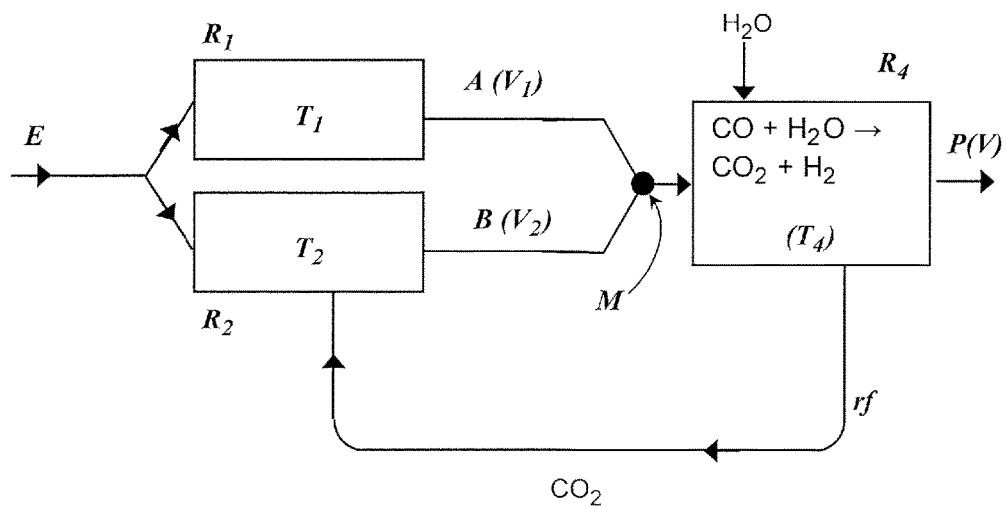
FIG. 5 is a schematic flow diagram showing the principle of another embodiment of the method and device according to the invention, in a modification of the embodiment shown in FIG. 1.

FIG. 5 shows the principle of another embodiment of the method and device according to the invention, in a modification of the embodiment shown in FIG. 1, as described above. Here, an additional reactor $R_4$ is provided which is arranged downstream of the two reactors $R_1$, $R_2$. In that reactor, the synthesis gas generated by mixing (M) the synthesis gas streams (A, B), formed in the sub-processes ($T_1$, $T_2$) and reactors ($R_1$, $R_2$), respectively, is subjected to a further sub-process ($T_4$), which comprises a water-gas shift reaction (reaction equation (III)). The $CO_2$ from the sub-process ($T_4$) can optionally be returned to the sub-process ($T_2$) as feed gas (line (rf) in FIG. 5).

Figure 6:
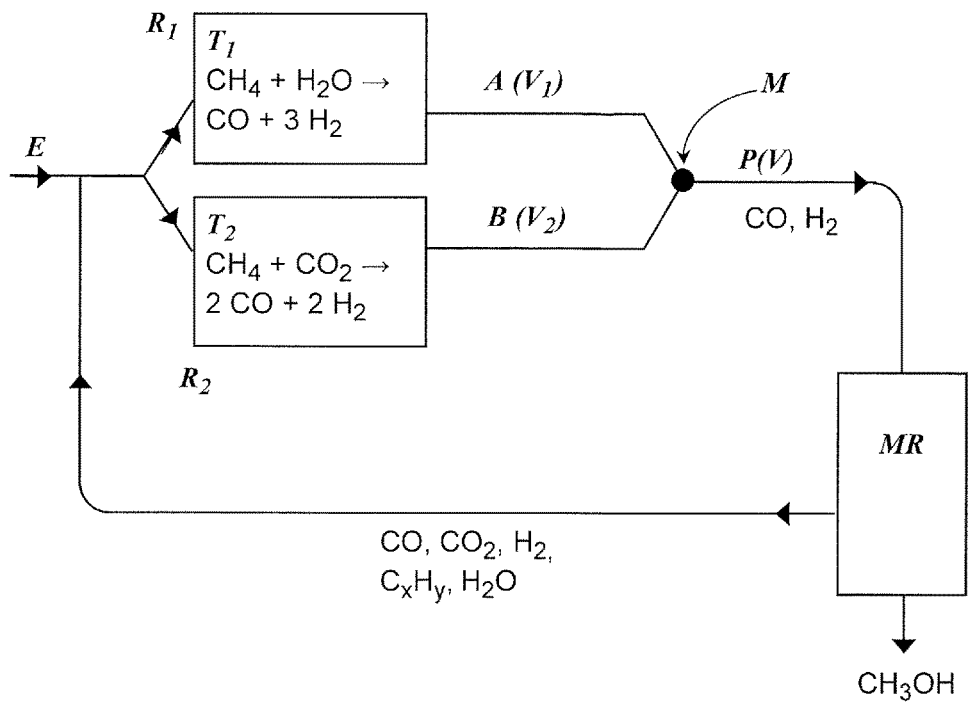
FIG. 6 is a schematic flow diagram showing the principle of another embodiment of the method and device according to the present invention, in a modification of the embodiment shown in FIG. 3.

FIG. 6 shows the principle of another embodiment of the method and device according to the present invention, in a modification of the embodiment shown in FIG. 3, as described above. The synthesis gas product (CO, $H_2$), produced by mixing (M) of the two synthesis gas sub-streams, is used in a further reactor (MR) for the (catalytic) synthesis of methanol and dimethyl ether. Unreacted synthesis gas and $CO_2$ accumulating in the synthesis are recycled back, as residual gas (CO, $H_2$, $CO_2$, $H_2O$, $C_xH_y$ (hydrocarbons)), to the beginning of the process chain for the production of synthesis gas and are used as feed gas or mixed into the feed gas. In this way, an almost 100% conversion of materials can be achieved.

Figure 7:
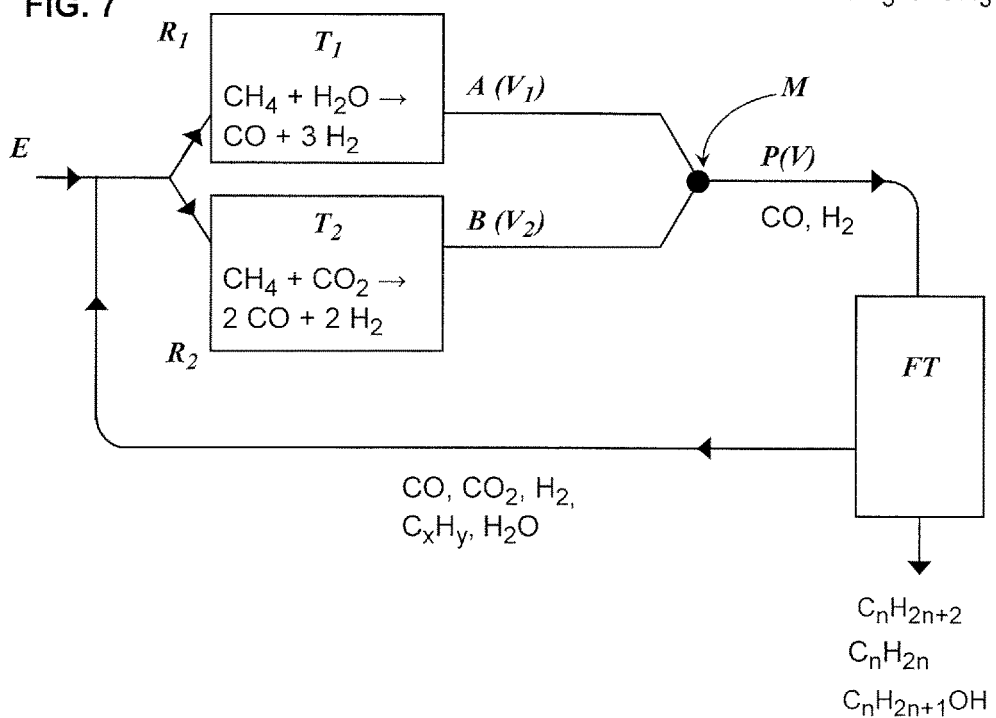
FIG. 7 is a schematic flow diagram showing a variant of the embodiment shown in FIG. 6.

FIG. 7 shows a variant of the embodiment shown in FIG. 6, wherein the synthesis gas product (CO, $H_2$), produced by mixing (M) the two synthesis gas sub-streams, is converted in a Fischer-Tropsch synthesis, in at least one further reactor (FT), into products such as liquid and gaseous hydrocarbons, alcohols, etc. The accumulating residual gas (may contain CO, $H_2$, $CO_2$, $H_2O$, $C_xH_y$) is recycled back into the process and re-used as the feed gas, or mixed into the feed gas, as described in FIG. 6.

The above-described embodiments, illustrated with reference to the drawings, represent only a few examples of embodiments and of applications of the present invention. Each of these exemplary embodiments can, either individually or in various combinations, form the subject matter of one or more claims. Furthermore, each of these embodiments can be combined with one or more feature(s) from the foregoing description of the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for producing a synthesis gas product having a desired, adjustable molar $CO/H_2$ ratio denoted by V from a hydrocarbon-containing starting material selected from the group consisting of pyrolysis gas, pyrolysis oil, flare gas, biogas and natural gas, the method comprising steps of:

performing a first sub-process $T_1$ by which a first synthesis gas A is generated from a first sub-stream of the hydrocarbon-containing starting material by feeding the first sub-stream of the hydrocarbon-containing starting material directly into a first plasma reactor, the first synthesis gas A having a molar ratio of CO to $H_2$ which is denoted by $V_1$, the first sub-stream of the hydrocarbon-containing starting material and the hydrocarbon-containing starting material having the same composition;

performing at least one additional sub-process selected from the group consisting of a second sub-process $T_2$ and a third sub-process $T_3$, wherein the second sub-process $T_2$ comprises generating a second synthesis gas B from a second sub-stream of the hydrocarbon-containing starting material by feeding the second sub-stream of the hydrocarbon-containing starting material directly into a second plasma reactor, the second synthesis gas B having a molar ratio of CO to $H_2$ denoted by $V_2$, wherein $V_1 \neq V_2$, the first and second sub-streams of the hydrocarbon-containing starting material having the same composition, and wherein the third sub-process $T_3$ comprises breaking down hydrocarbon(s) of a third sub-stream of the hydrocarbon-containing starting material into solid carbon and hydrogen by feeding the third sub-stream of the hydrocarbon-containing starting material directly into a third plasma reactor, the first and third sub-streams of the hydrocarbon-containing starting material having the same composition; and combining the first synthesis gas A generated in the first sub-process $T_1$ with at least one of the second synthesis gas B generated in the second sub-process $T_2$ and the hydrogen produced in the third sub-process $T_3$ to obtain the synthesis gas product having the desired molar $CO/H_2$ ratio V by adjusting a mixing ratio of the combined gases.

2. The method according to claim 1, wherein $V_1$ is less than $V_2$, optionally $V_1 < 1$ and $V_2 \geq 1$.

3. The method according to claim 1, wherein at least one of the first and second sub-processes ($T_1$, $T_2$) generates a low-hydrogen synthesis gas whose molar ratio of CO to $H_2$ is at least 1, and wherein at least one other of the first and second sub-processes ($T_2$, $T_1$) generates a high-hydrogen synthesis gas whose molar ratio of CO to $H_2$ is less than 1.

4. The method according to claim 3, wherein the at least one other of the first and second sub-processes ($T_1$, $T_2$) for producing a high-hydrogen synthesis gas is based on a following reaction equation:

$$C_nH_{2n+2} + n.H_2O \rightarrow n.CO + (2n+1).H_2, \quad (I)$$

wherein $C_nH_{2n+2}$ represents alkane, and n is 1 to 20; and wherein the reaction is optionally:

$$CH_4 + H_2O \rightarrow CO + 3H_2 \quad (Ia).$$

5. The method according to claim 1, wherein at least one of the first and second sub-processes ($T_1$, $T_2$) generates a low-hydrogen synthesis gas based on a following reaction equation:

$$C_nH_{2n+2} +_n.CO2 \rightarrow 2_n.CO + (n+1).H_2, \quad (II)$$

wherein $C_nH_{2n+2}$ represents alkane, and n is 1 to 20; and wherein the reaction is optionally:

$$CH_4 + CO_2 \rightarrow 2CO + 2H_2 \quad (IIa).$$

6. The method according to claim 1, wherein the first sub-process ($T_1$) generates the first synthesis gas A based on a following reaction equation:

$$C_nH_{2n+2} + n.CO_2 \rightarrow 2n.CO + (n+1).H_2, \quad (II)$$

wherein $C_nH_{2n+2}$ represents alkane, and n is 1 to 20, wherein the first synthesis gas A is a low-hydrogen synthesis gas, and wherein the reaction is optionally:

$$CH_4 + CO_2 \rightarrow 2\ CO + 2\ H_2; \quad (IIa)$$

wherein the second sub-process ($T_2$) produces the second synthesis gas B according to a following reaction equation:

$$C_nH_{2n+2}n.H_2O \rightarrow n.CO + (2n+1).H_2, \text{tm (I)}$$

wherein $C_nH_{2n+2}$ represents alkane, and n is 1 to 20, wherein the second synthesis gas is a high-hydrogen synthesis gas, and wherein the reaction is optionally:

$$CH_4 + H_2O \rightarrow CO + 3\ H_2; \quad (Ia) \text{ and}$$

wherein the first and second synthesis gases A B are combined, during which the mixing ratio is adjusted such that the synthesis gas product having the desired molar $CO/H_2$ ratio V is obtained.

7. The method according to claim 6, wherein the mixing ratio of the first and second synthesis gases A and B is adjusted by one of the first and second sub-processes being run at a higher or lower throughput than the respective other sub-process.

8. The method according to claim 7, wherein the second sub-process which produces the high-hydrogen synthesis gas run at a higher throughput than the first sub-process at 1.5 times to 10 times the throughput relative to the first sub-process.

9. The method according to claim 1, wherein the molar ratio of CO to $H_2$ ($V_1, V_2, \ldots$) present in the synthesis gases (A, B, . . . ) produced by the sub-processes is determined continuously, and the sub-processes are controlled by open-loop or closed-loop control as a function of a determined ratio such that a synthesis gas product having the desired CO/H$_2$ ratio V is obtained.

10. The method according to claim 1, wherein the third sub-processes (T$_3$) causes pyrolytic decomposition of hydrocarbons according to a following reaction equation:

$$C_nH_{2n+2} \rightarrow n.C_{solid}+(2n+2).H_2; \quad (IV)$$

wherein the reaction is optionally:

$$CH_4 \rightarrow C_{solid}+2\,H_2 \quad (IVa)$$

11. The method according to claim 10, wherein the pyrolytic decomposition of hydrocarbons is combined with a sub-process for producing a low-hydrogen synthesis gas and/or with a sub-process for producing a high-hydrogen synthesis gas, and wherein the hydrogen produced by the pyrolytic decomposition is combined with the synthesis gas of one of the first and second sub-processes (T$_1$, T$_2$) to increase the proportion of hydrogen contained in the synthesis gas.

12. The method according to claim 11, wherein the sub-process for producing a high-hydrogen synthesis gas is based on a following reaction equation:

$$C_nH_{2n+2}+n.H_2O \rightarrow n.CO+(2n+1).H_2, \quad (I)$$

wherein C$_n$H$_{2n+2}$ represents alkane, and n is 1 to 20; and wherein the reaction is optionally:

$$CH_4+H_2O \rightarrow CO+3\,H_2 \quad (Ia).$$

13. The method according to claim 11, wherein the sub-process for generating a low-hydrogen synthesis gas is based on a following reaction equation:

$$C_nH_{2n+2}+n.CO_2 \rightarrow 2n.CO+(n+1).H_2, \quad (II)$$

wherein C$_n$H$_{2n+2}$ represents alkane, and n is 1 to 20; and wherein the reaction is optionally:

$$CH_4+CO_2 \rightarrow 2CO+2\,H_2 \quad (IIa).$$

14. The method according to claim 1, further comprising a downstream sub-process T$_4$ based on a water-gas shift reaction (III) which causes an increase in the H$_2$ content present in the synthesis gas product:

$$CO+H_2O \rightarrow 2CO_2+H_2 \quad (III).$$

15. The method according to claim 1, wherein at least two of the sub-processes for synthesis gas production based on following reaction equations (I) and (II) are carried out in a combined manner in a same plasma reactor:

$$C_nH_{2n+2}+n.H_2O \rightarrow n.CO+(2n+1).H_2, \quad (I)$$

$$C_nH_{2n+2}+n.CO_2 \rightarrow 2n.CO+(n+1).H_2 \quad (II)$$

16. The method according to claim 15, wherein a proportion of admixed CO$_2$ and/or a proportion of admixed H$_2$O is varied as a function of the composition of the hydrocarbon-containing starting material, optionally a hydrocarbon-containing feed gas, in order to obtain a synthesis gas product having a constant CO/H$_2$ ratio.

17. The method according to claim 15, wherein the hydrocarbon-containing starting material (C$_n$H$_{2n+2}$) is a biogas mixed with CO$_2$ and/or H$_2$O and is converted to the desired synthesis gas product, optionally in a microwave plasma reactor.

18. The method according to claim 1, wherein a hydrocarbon-containing starting material having a CO$_2$ content is used as a starting material, and wherein the starting material is converted in a first sub-process according to a reaction formula:

$$C_nH_{2n+2}+n.CO_2 \rightarrow 2n.CO+(n+1).H_2 \quad (II)$$

to a synthesis gas which is converted in a second sub-process, with addition of water, to a synthesis gas higher in hydrogen, wherein the two sub-processes are carried out in a combined manner in a same plasma reactor, optionally in a microwave plasma reactor.

19. The method according to claim 1, wherein a hydrocarbon-containing gas which, relative to the hydrocarbon content, contains CO$_2$ in excess is used as a starting material, the gas optionally being a pyrolysis gas or a flare gas, wherein this feed gas is enriched with hydrocarbons or with a hydrocarbon-containing mixture, optionally natural gas, prior to use as a starting material or during the conversion to synthesis gas.

20. The method according to claim 19, wherein the starting material enriched with hydrocarbons is converted under action of a plasma, optionally a microwave plasma, to synthesis gas, with addition of water to increase the hydrogen content of the synthesis gas.

21. The method according to claim 1, wherein a hydrocarbon which is liquid under normal conditions or a mixture of hydrocarbons which is liquid under normal conditions, optionally oils from a pyrolysis, is used as the hydrocarbon-containing starting material.

22. The method according to claim 1, wherein the synthesis gas product(s) is/are used in at least one subsequent synthesis process as a starting material(s), and wherein a residual proportion of unreacted synthesis gas accumulating in the subsequent synthesis process is admixed to the hydrocarbon-containing starting material and thereby recycled back into the method.

23. A method for the production of synthesis gas from a hydrocarbon-containing starting material according to claim 1, wherein the hydrocarbon-containing starting material, in a gaseous form, is enriched with hydrocarbons prior to or during its use for synthesis gas production, the gaseous hydrocarbons or a hydrocarbon-containing gas being selected from the group comprising methane, ethane, propane, butane and natural gas.

* * * * *